UNITED STATES PATENT OFFICE.

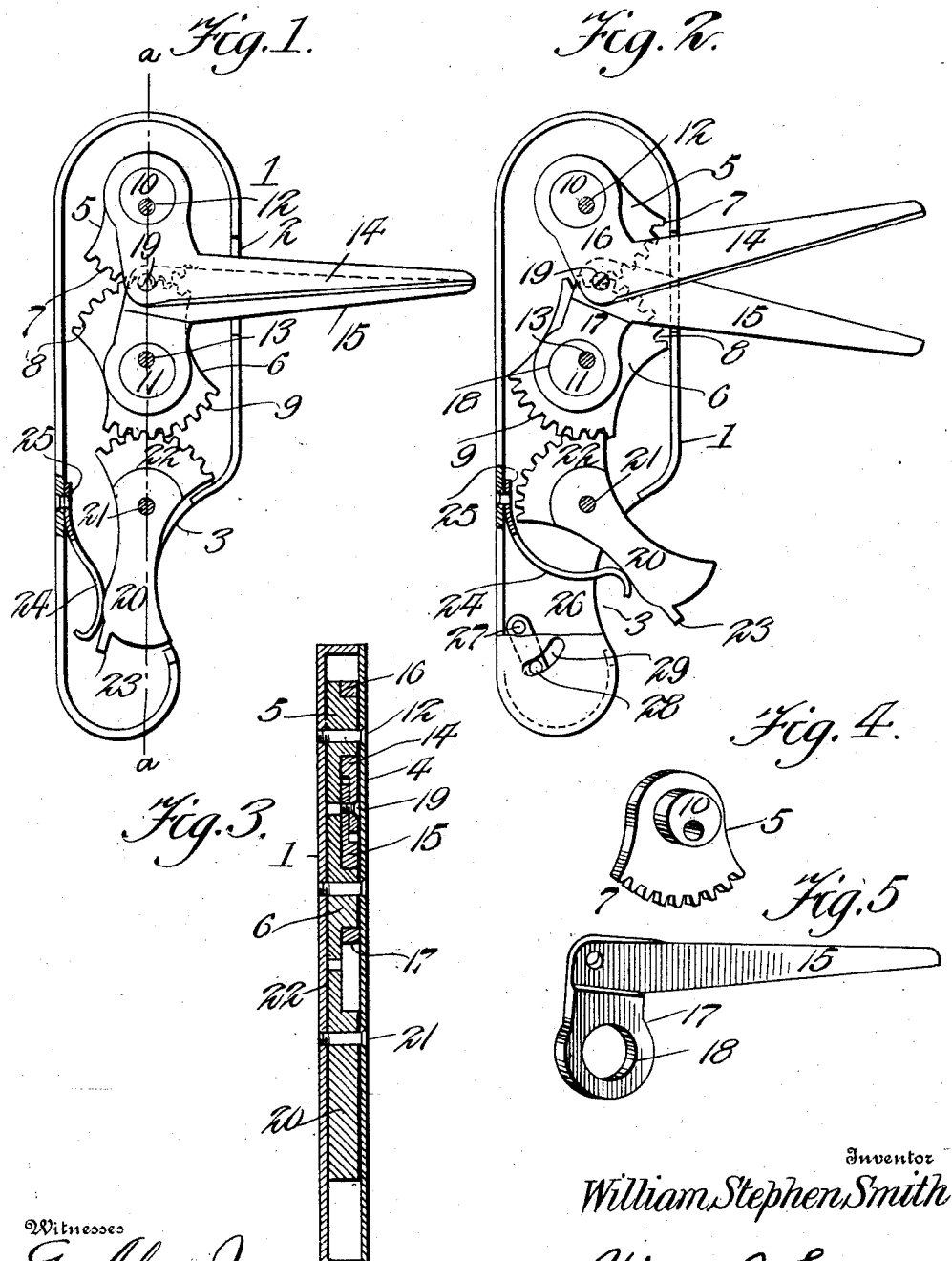

WILLIAM STEPHEN SMITH, OF COLFAX, WASHINGTON.

POCKET-SCISSORS.

No. 906,950.   Specification of Letters Patent.   Patented Dec. 15, 1908.

Application filed July 15, 1908. Serial No. 443,671.

*To all whom it may concern:*

Be it known that I, WILLIAM STEPHEN SMITH, a citizen of the United States, residing at Colfax, in the county of Whitman and State of Washington, have invented new and useful Improvements in Pocket-Scissors, of which the following is a specification.

This invention relates to improvements in scissors and shears and more particularly to scissors such as are adapted to be readily carried in the pocket and the invention consists essentially in the combination of elements mounted for simultaneous and oscillating movement and blades pivotally connected together and also pivotally connected to the oscillated elements at points eccentric to the pivotal axes of the latter, and the invention further consists in the construction, combination and arrangement of devices herein described and claimed.

One object of the invention is to provide improved means for oscillating the blades of the scissors or shears and prevent said blades from working loose laterally, and hence cause the blades to at all times bear against each other and greatly facilitate the cutting action of the sharpened edges of the blades.

A further object of the invention is to provide scissors with a casing in which the inner ends of the scissors blades and the operating means therefor are inclosed, which casing is adapted to act also as a handle for the scissors and is adapted to be readily placed in a pocket.

In the accompanying drawings:—Figure 1 is an elevation of a pair of pocket scissors constructed in accordance with my invention with one side of the casing removed and the pivots of the blades and of the operating lever shown in section and the blades shown in closed position. Fig. 2 is a similar view of the same with one side of the casing removed in part, portions of the casing and axes of the blades being shown in section a scissors blade shown open. Fig. 3 is a sectional view on a plane at right angles to that of Fig. 1, and intersecting the pivots of the scissors blades and the operating lever therefor as indicated by line $a$—$a$ of Fig. 1. Fig. 4 is a detail perspective view of one of the oscillating gears which connect the blades together. Fig. 5 is a similar view of one of the blades.

In the embodiment of the invention here shown the casing 1 is of such size and shape to enable it to be readily placed in a pocket, is provided in one side with openings 2, 3 and is also provided with a removable plate 4. In practice this casing may be of metal or any suitable material.

In the casing are a pair of oscillating elements 5, 6 which are here shown as segment gears, the gear 5 having teeth 7 and the gear 6 having two sets of teeth designated respectively at 8, 9, the teeth 8 of gear 6 engaging the teeth 7 of gear 5. Each of the said gears is provided with a cam which is eccentric to the pivotal axes thereof. The cam of the gear 5 is indicated at 10 and that of the gear 6 is indicated at 11, the respective pivotal axes of the said gears being here shown as screws 12, 13 which also serve to secure the plate 4 of the casing in place. It will be observed by reference to Figs. 1 and 2 of the drawings that the cams 10, 11 extend substantially in opposite directions from their respective pivots.

The blades 14, 15 of the gears are respectively provided at their inner ends with oppositely extending arms 16, 17 the said arms being provided with circular openings 18 to receive the cams 10, 11. The inner ends of the said blades are pivotally connected together as by means of a pivot screw 19 which pivot screw prevents either of the blades from moving laterally and serve to keep the opposing surfaces of the blades in contact with each other so that the respective cutting edges of the blades are in contact with each other and the cutting action of the scissors is greatly facilitated.

It will be understood from the foregoing description and by reference to the drawings that by reason of the gears or oscillating elements being intermeshed they necessarily move simultaneously, that such movement of the gears or oscillating elements causes the blades to open and close as in the usual manner of scissors blades and it will also be understood that the eccentrics 10, 11 prevent lost motion between the scissors blades and on the pivotal connection 19 between them. The blades 14, 15 project out through the opening 2 of the casing.

In order to actuate the scissors blades I provide an operating lever 20 which is pivotally mounted in the casing on a pivot screw 21, which also serves to assist in securing the plate 4 in place. The said lever has at its inner end a gear segment 22 the teeth of which engage the teeth 9 of the gear or oscillating element 6. The free end of the said lever is disposed to operate in and through the opening 3 of the casing is provided with a stop lug 23 and a spring 24 is secured in the casing as at 25 and bears against said operating lever to move the same outwardly as shown in Fig. 2 of the drawings and cause the scissors blades to open. The person using the scissors grasps the casing which serves as a handle and with the fore-finger presses the lever 20 against the resistance of the spring 24 and thereby actuates the oscillating gears to close the scissors blades and cause them to cut.

Within the casing is a stop arm 26 which is pivoted at 27 and has a stud 28 which operates in and extends through a segment slot 29. The said stop stud may be moved into engagement with the stop lug 23 of the operating lever 20 to lock the latter in the position shown in Fig. 1, as will be understood. When the stop stud 28 is in the position shown in Fig. 2 it is entirely out of the path of the stop lug 23 and the lever may be operated at will.

I claim:—

1. In a device of the class described the combination of elements mounted for simultaneous oscillating movement and blades pivotally connected together and also pivotally connected to the oscillating elements at points eccentric to the pivotal axes of the latter.

2. In combination with the blades or scissors or shears or the like and means pivotally connecting them together, oscillating elements mounted for simultaneous movement and means pivotally connecting said blades to said oscillating elements at point seccentric to the pivoted axes of said oscillating elements.

3. In scissors and the like devices the combination of a base or a handle element, intermeshing oscillating gears mounted thereon, blades pivotally connected together and having outstanding arms at their inner ends and cams on said intermeshing gears eccentric to the axes thereof and engaging openings in said arms of the blades.

4. The combination of a casing forming a handle and having openings in one side, intermeshing oscillating gears mounted in said handle, an operating lever mounted in said handle, movable through one of said openings and having a gear engaging one of the intermeshing gears and a pair of blades pivotally connected together and also pivotally connected to said intermeshing gears at points eccentric to the axes of said intermeshing gears, said blades extending through the other opening in said casing.

In testimony whereof I affix my signature in presence of two witnesses.

WILLIAM STEPHEN SMITH.

Witnesses:
S. T. CHADWICK,
CLAUDE SWEGLE.